United States Patent
Murphy et al.

(10) Patent No.: US 12,236,763 B2
(45) Date of Patent: Feb. 25, 2025

(54) INTRUSION DETECTION ALGORITHM WITH REDUCED TUNING REQUIREMENT

(71) Applicant: Network Integrity Systems, Inc., Hickory, NC (US)

(72) Inventors: Cary R. Murphy, Hickory, NC (US); Daniel M Goertzen, Winnipeg (CA); Mark K Bridges, Hickory, NC (US); Joseph Giovannini, Hickory, NC (US)

(73) Assignee: Network Integrity Systems, Inc., Hickory, NC (US)

( * ) Notice: Subject to any disclaimer, the term of this patent is extended or adjusted under 35 U.S.C. 154(b) by 340 days.

(21) Appl. No.: 17/946,533

(22) Filed: Sep. 16, 2022

(65) Prior Publication Data
US 2024/0096185 A1 Mar. 21, 2024

(51) Int. Cl.
*G08B 13/189* (2006.01)
*G08B 13/12* (2006.01)

(52) U.S. Cl.
CPC ......... *G08B 13/189* (2013.01); *G08B 13/124* (2013.01)

(58) Field of Classification Search
CPC .. G08B 13/189; G08B 13/124; G08B 29/185; G01H 9/004; G01D 5/35361; G01M 11/3109
See application file for complete search history.

(56) References Cited

U.S. PATENT DOCUMENTS

| | | | |
|---|---|---|---|
| 5,384,635 A | 1/1995 | Cohen et al. | |
| 11,763,648 B2 * | 9/2023 | Kojima | G08B 13/19641 340/555 |
| 2013/0188177 A1 | 7/2013 | Lovely et al. | |
| 2018/0080812 A1 | 3/2018 | Wu et al. | |
| 2020/0005036 A1 | 1/2020 | Ji et al. | |

FOREIGN PATENT DOCUMENTS

| | | |
|---|---|---|
| GB | 2445364 | 7/2008 |
| WO | WO 2015/159081 | 10/2015 |
| WO | WO 2018/002582 | 1/2018 |

* cited by examiner

*Primary Examiner* — Joseph H Feild
*Assistant Examiner* — Sharmin Akhter
(74) *Attorney, Agent, or Firm* — Adrian D. Battison; Ade & Company Inc.; Ryan W. Dupuis

(57) ABSTRACT

An optical fiber is monitored for an intrusion event where reflected optical signals are divided into streams each associated with a respective location on the optical fiber. Blocks of the streams are selected each containing a plurality of streams and the streams are collated, for example by averaging, to create a single stream to which an algorithm is applied to create coefficients which are compared with a threshold value to generate an output indicative of disturbance of the fiber by an intrusion event. Each block representative of a length of the fiber is thus treated as a zone and the detection algorithm is applied to each. This creates a DAS system that does not require unique tuning as each zone is independently monitored. Applying the above zone principles and algorithms to the DAS system also provides a high level of nuisance alarm and false alarm rejection.

20 Claims, 9 Drawing Sheets

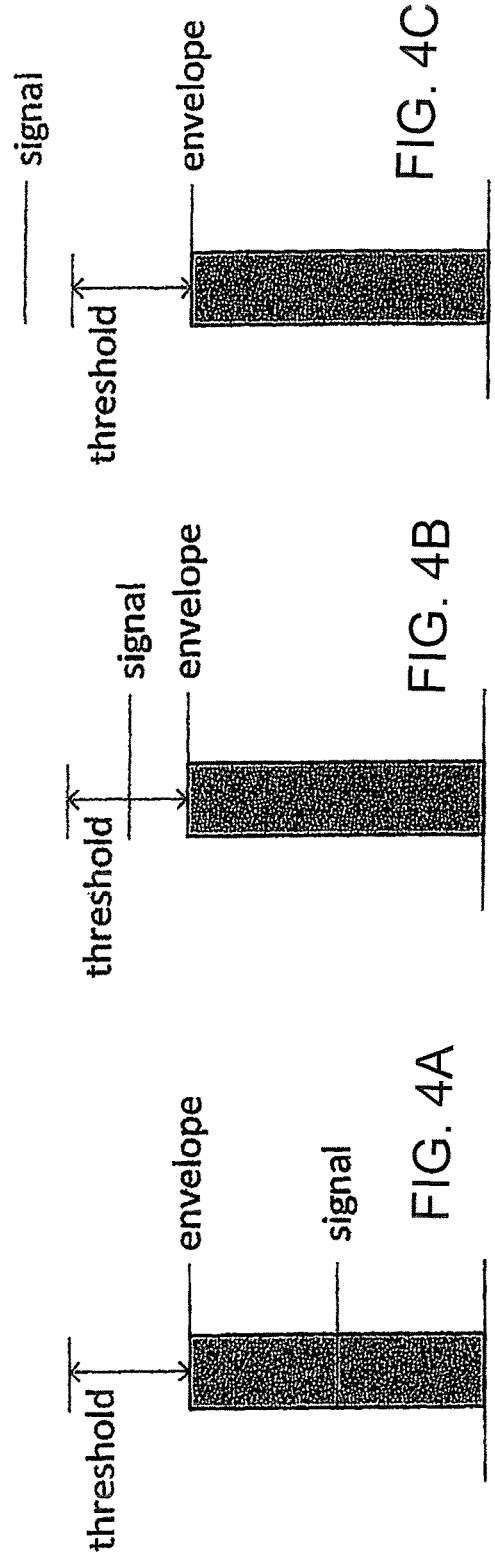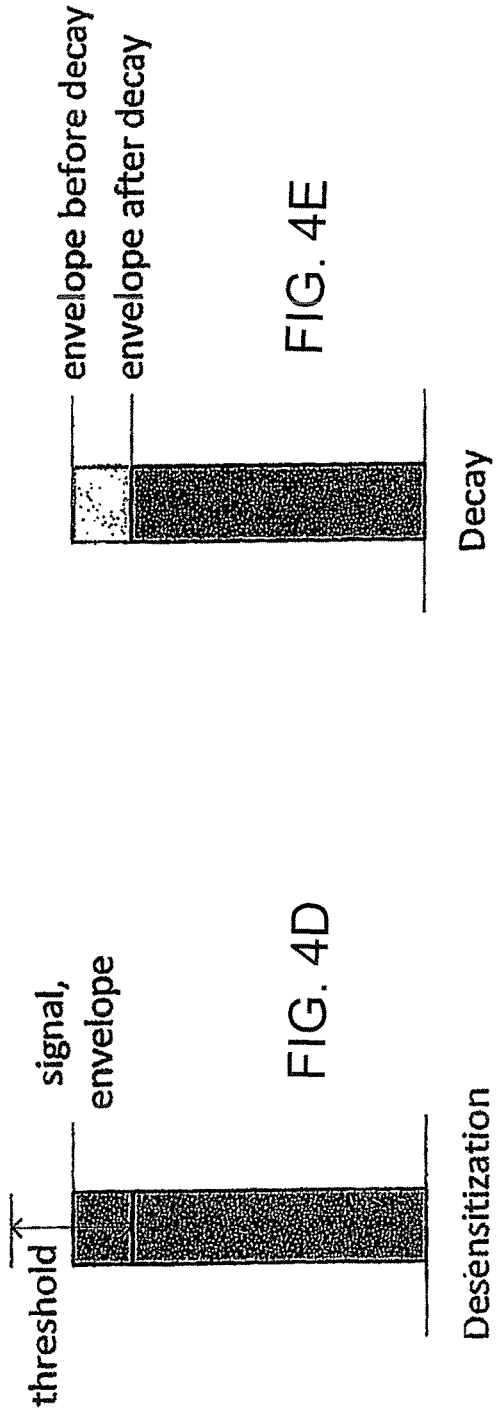

INTRUSION DETECTION ALGORITHM WITH REDUCED TUNING REQUIREMENT

This invention relates to a method of or algorithm for analyzing a monitoring signal from an optical fiber to detect intrusion attempts and other nefarious or intentional disturbances while reducing the necessity for tuning of the system for each installation. This is particularly applicable to perimeter security such as at a fence where an optical fiber extends along at least part of the fence and generates changes in a monitor signal transmitted along the fiber in response to any disturbance of the fiber such as movement or vibration caused by an intrusion attempt such as climbing, lifting or cutting. However the method herein can be used in relation to the monitoring of other fibers which can be moved in response to other types of intrusion events. The term disturbance is used herein as this includes both movement and vibration as the difference between these is subtle. The point is that the intention is to detect any disturbance of the fiber which is indicative of an event to be monitored.

The method is particularly applicable to monitoring systems which operate by introducing a monitoring optical signal into the optical fiber, receiving optical signals from the optical fiber which are modified by events which affect the optical fiber wherein the optical signals are into a plurality of streams, where each stream is associated with a specific respective portion of the optical fiber with the portions divided along the length of the optical fiber so that each stream is indicative of disturbances in the respective portion and wherein each stream comprises a series of data values indicative of the magnitude of the disturbances in the respective portion over time.

BACKGROUND OF THE INVENTION

One example of a monitoring system of this type is known as Distributed Acoustic Sensing (DAS) where vibrations and displacements cause localized shifts in the path length of the optical fiber. This is detected by a high precision optical Time Domain Reflectometer (OTDR). This OTDR is often referred to as a Phase-OTDR or φ-OTDR, and measures changes in the distance between points of Rayleigh backscatter.

In Rayleigh scatter based distributed fiber optic sensing, a coherent laser pulse is sent along an optic fiber, and scattering sites within the fiber cause the fiber to act as a distributed interferometer with a gauge length approximately equal to the pulse length. The intensity of the reflected light is measured as a function of time after transmission of the laser pulse. When the pulse has had time to travel the full length of the fiber and back, the next laser pulse can be sent along the fiber. Changes in the reflected intensity of successive pulses from the same region of fiber are caused by changes in the optical path length of that section of fiber. This type of system is very sensitive to both strain and temperature variations of the fiber and measurements can be made almost simultaneously at all sections of the fiber.

The sensitivity and speed of Rayleigh-based sensing allows distributed monitoring of acoustic signals over distances of more than 100 km from each laser source. Typical applications include continuous monitoring of pipelines for unwanted interference and for leaks or flow irregularities; monitoring of power cables for unwanted interference and cable faults; monitoring traffic (roads, railways and trains [6]), borders, and other sensitive perimeters for unusual activity; and even oil well monitoring applications where the technology allows the state of the well all along its length to be determined in real-time. The ability of the optic fiber to operate in harsh environments makes the technology especially well-suited for scenarios in which typical sensing systems are unusable or impractical due to environmental conditions.

However other sensing systems than DAS can generate the above streams of data values related to specific points along the fiber.

This DAS method is used in the Focus products from Network Integrity Systems and uses the method as shown for example in U.S. Pat. No. 9,002,149 (Rogers) assigned to Fotech Solutions Limited.

The Distributed Acoustic Sensor (DAS) connected to one end of the fiber uses a laser to send thousands of short pulses of light along the fiber every second. A small proportion of the light travelling in a fiber is reflected back by the process known as Rayleigh Backscatter. Vibrations from the surrounding environment, will disturb the light in the fiber and will therefore be observed by the DAS interrogator.

As the data is processed in real time, advanced algorithms can recognize the unique signatures of each type of event. The events that are of concern are reported to the alarm server.

DAS systems can require a calibration and fine-tuning process that resembles a combination of science and art. This is very time consuming, and the performance of the system is reliant upon the skill of the tuning specialist.

Using advanced AI technology, the system differentiates between background noises and real threats. When acoustic events occur along a fiber optic cable, they are detected by the system, which processes all the acoustic data received and applies its detection algorithms to identify and classify events (e.g. digging, climbing, and pipeline leaks). Using artificial intelligence on the data received, the system determines if an event is a 'threat' to the integrity of an asset and when to raise the alarm.

That is conventional DAS systems when being installed require that the tuning specialist carries out extensive trials on the system to apply sample stimuli to the optical fiber, or the component on which it is mounted for monitoring, at various positions along its length and then to record the response to those sample stimuli as a signature event. This is of course a very time-consuming process which requires different types of the stimuli to be applied at many different locations on the fiber. This generates a large number of signature events for comparison. The system then operates to look for data generated by the signals from the fiber which are similar to or comparable to one of the signature events. Work to improve this system requires the generation of and comparison with a larger number of signature events using AI. The intention is to create a large library of signature events for comparison. However the signature events can still vary with each particular installation so that the same process of applying sample stimuli and generating signature events must be carried out at each new installation.

As part of this system it is known to divide the full length of the fiber into separate sections such as a first and second different fence sections, a gate, a particularly sensitive location within the structure, and the like. This is done as part of the installation and as above each section must be individually analyzed with sample stimuli to generate the signature events for each section.

The system when installed and tuned can then show an operator the precise location of the threat, provide information about what event has taken place and give the operator the opportunity to make a timely and proportionate response. The DAS system includes a highly configurable sensor, which means that the laser pulse frequency, pulse width and many other parameters can be controlled enabling the system to be tuned to each customer's specific requirements.

The alarm management server provides accurate and actionable alarms and displays them on a map. Also the user can automatically record targeted segments of data, and store, replay, and evaluate that data. These data segments can be used to enhance and refine existing detection systems, or to create new detection parameters.

DAS systems thus typically requires the above calibration and fine-tuning process that resembles a combination of science and art. This is very time consuming, and the performance of the system is reliant upon the skill of the tuning specialist.

In addition, DAS systems are challenged with nuisance alarming during inclement weather. This is because the weather events can generate data in the signal from the fiber which closely match the signature events previously recorded. A common approach is to suppress alarms during said weather—effectively deafening the system. The high rate of nuisance alarms is taxing to the monitoring system and infuriating to the end user.

Thus the present invention addresses some common challenges with DAS, particularly but not exclusively, when used for perimeter security systems.

DAS, particularly when fence mounted, is vulnerable to extreme weather conditions such as wind and rain. Due to the nature and significant sensitivity of the DAS system, weather phenomena may overwhelm the signal. This can cause the system to experience diminished or compromised sensitivity to detection of the event that it has been implemented to catch. It is not unheard of in the industry for a DAS or similar system to simply exhibit decreased sensitivity during extreme weather conditions, enabling a cognizant nefarious party a window of opportunity.

The above weather induced shortcoming can be overcome with optimized fence quality and tuning skill. With a fence that meets strict requirements, coupled with expert tuning, the DAS systems are not doomed to the weather vulnerability. Rather, weather raises the level of effort required for a successful installation.

SUMMARY OF THE INVENTION

It is one object of the present invention to provide a method or system for analysis of the data from a system of this type such as DAS which reduces the level of tuning required at an installation.

According to the invention therefor there is provided a method for monitoring an optical fiber for disturbance events of the optical fiber comprising:
introducing a monitoring optical signal into the optical fiber;
receiving optical signals from the optical fiber which are modified by disturbance events on the optical fiber;
wherein the optical signals are divided into a plurality of data streams, where each data stream is associated with a specific respective portion of the optical fiber with the portions divided along the length of the optical fiber so that each data stream is indicative of disturbances in the respective portion;
wherein each data stream comprises a series of data values representative of the disturbances over time in the respective portion;
selecting for analysis at least one block of the data streams where each selected block of the data streams contains a plurality of data streams so that the selected block is associated with a length of the optical fiber containing a plurality of the portions and so that the plurality of data streams of the selected block are indicative of disturbances in the length of the selected block;
for each selected block, collating the data streams of the selected block into a common data stream so that the common data stream is representative of the disturbances over time in the whole length of the associated selected block;
and applying an algorithm to the common data stream of each selected block:
and in response to the algorithm generating an output indicative of a detection of a disturbance event.

Typically in one example the data streams are collated by a mathematical averaging system. That is all of the data streams in the selected block are combined by a suitable mathematical averaging system such as a summation, a simple average, weighted averaging, and other algorithms known to persons in the art to generate a single value representative of a plurality of values.

Preferably the algorithm is separately applied to the common data stream of each selected block. That is the data from selected block or blocks are analyzed independently bearing in mind the characteristics of that block to generate an event alert for each block independently.

As stated above, for each selected block the data streams of the selected block are collated into one common data stream. However in addition as an additional step the same data streams may be collated differently into one or more other common streams for independent analysis. Thus there does not have to be a single stream, just the creation of a common data stream which is independently analyzed.

The common data stream may contain more than one data element. That is it may contain a stream of parallel data elements which together provide information on the disturbance of the length associated with the block as a whole.

Preferably the algorithm comprises carrying out an analysis on the common data stream to create at least one coefficient value dependent on the data values in the common data stream and comparing said at least one coefficient value with a threshold value to generate said output indicative of a detection of a disturbance event. that is preferably the analysis is based on a comparison with an existing threshold. As explained below the threshold can be variable and may be used in different comparison arrangements.

As one example, the analysis can be frequency or time based as described in the above cited patents and may particularly use a Fourier transform to generate the coefficients.

In this arrangement it is an important feature that the algorithm is based on determining differences from ambient disturbances and does not use recorded signatures from sample stimuli applied to the optical fiber as described above in relation to the above DAS systems. Thus the system herein carries out an analysis which looks for differences from an expected status rather than the prior art DAS system which tries to compare the data with known signatures of known events.

The blocks can be selected so that the number of streams in one block is different from the number of streams in other blocks. That is the length of the fiber that is being analyzed by the selection of a particular block can be tailored to the structure of the object being monitored, such as a perimeter fence with gates.

According to a further definition of the invention there is provided a method for monitoring an optical fiber for disturbance events of the optical fiber comprising:

introducing a monitoring optical signal into the optical fiber;

receiving optical signals from the optical fiber which are modified by disturbance events on the optical fiber;

wherein the optical signals are divided into a plurality of data streams, where each data stream is associated with a specific respective portion of the optical fiber with the portions divided along the length of the optical fiber so that each data stream is indicative of disturbances in the respective portion;

wherein each data stream comprises a series of data values representative of the disturbances over time in the respective portion;

selecting for analysis at least one block of the data streams where each selected block of the data streams contains a plurality of data streams so that the selected block is associated with a length of the optical fiber containing a plurality of the portions and so that the plurality of data streams of the selected block are indicative of disturbances in the length of the selected block;

for each selected block, generating at least one common data stream so that the common data stream is representative of the disturbances over time in the whole length of the associated selected block;

and applying an algorithm to the common data stream of each selected block:

wherein the algorithm comprises carrying out an analysis on the common data stream to create at least one coefficient value dependent on the data values in the common data stream and comparing said at least one coefficient value with a threshold value to generate an output indicative of a detection of a disturbance event.

According to a further definition of the invention there is provided a method for monitoring an optical fiber for disturbance events of the optical fiber comprising:

introducing a monitoring optical signal into the optical fiber;

receiving optical signals from the optical fiber which are modified by disturbance events on the optical fiber;

wherein the optical signals are divided into a plurality of data streams, where each data stream is associated with a specific respective portion of the optical fiber with the portions divided along the length of the optical fiber so that each data stream is indicative of disturbances in the respective portion;

wherein each data stream comprises a series of data values representative of the disturbances over time in the respective portion;

selecting for analysis at least one block of the data streams where each selected block of the data streams contains a plurality of data streams so that the selected block is associated with a length of the optical fiber containing a plurality of the portions and so that the plurality of data streams of the selected block are indicative of disturbances in the length of the selected block;

for each selected block, generating at least one common data stream so that the common data stream is representative of the disturbances over time in the whole length of the associated selected block;

and applying an algorithm to the common data stream of each selected block;

wherein the algorithm is based on determining differences from ambient disturbances and does not use recorded signatures from sample stimuli applied to the optical fiber;

and in response to the algorithm generating an output indicative of a detection of a disturbance event.

In a preferred method the number of streams in each block can be selected or tailored to select desired sections of the length of the optical fiber. These can be at locations of high importance such as gates. That is the number of streams in each block is variable or selectable to achieve desired implementation of the system.

In typical or practical systems there is preferably a plurality of blocks and the algorithm is applied to each block independently of other blocks.

In typical or practical systems in some cases one block is selected so as to monitor an entire length of the optical fiber or a portion thereof.

In regard to the implementation by DAS, the blocks preferably form a waterfall of the data values from the received optical signals.

In typical or practical systems, a width of the blocks defined by the number of streams therein can be dynamically changed for example in response to changes in environment.

Preferably each block contains the streams of signals at each of these locations along the fiber as it changes over time and the analyzing of the streams allows analysis of zones of the optical fiber as small as the sampling rate of the interrogator, or as large as the entire span.

The streams in each block can comprise raw data from the received signals or the streams may be pre-processed such as by filtering or averaging.

In one optional implementation, each stream has the data values thereof averaged over time. In a DAS or other similar systems of the type used herein, the signal at each location along a fiber asset is buried in random noise. A sliding average over time at each location, or stream, will reduce the randomness and produce a level indicative of the actual signal which is then passed to the algorithms for processing.

Preferably each stream is divided by time and/or distance along the fiber so as to be associated with a specific respective portion of the optical fiber with the portions divided along the length of the optical fiber.

This system can be used with advantage in an arrangement for automatically changing a sensitivity of the analysis to accommodate changing noise on the fiber.

Typically, the optical fiber is installed along an object such as a perimeter fence to be monitored and the number of streams each block is selected on installation of the optical fiber in relation to different features of the object to be monitored along its length.

In one example of the algorithm to which the data values are applied, a transform function is used to convert selected temporal sequences of digital samples into a set of frequency dependent transform coefficients and wherein the set of transform coefficients is compared against an envelope where the envelope is a block of coefficients the same size as the set of transform coefficients and indicating an intrusion event if a transform coefficient exceeds an envelope coefficient by a predetermined threshold value. The transform function can comprise a Fourier transform or a Wavelet transform. Thus typically, when the transform coefficient is greater than the envelope coefficient but by a value less than the threshold value, the envelope coefficients are changed to make the analysis less sensitive to accommodate increasing environmental noise conditions by increasing the envelope coefficients to a larger value and the envelope coefficients are decayed over time by periodically reducing each envelope coefficient by a decay value so as to make the analysis more sensitive to accommodate decreasing environmental noise conditions by decreasing the envelope coefficients to a smaller value. In this analysis preferably each transform coefficient of the set of transform coefficients is compared against a respective associated one of a set of envelope coefficients of the block of coefficients and an intrusion event is indicated if at least one transform coefficient exceeds the respective associated one of the envelope coefficients by the predetermined threshold value;

In order to improve sensitivity adjustment, in respect of those analyses where an intrusion event is detected, the envelope coefficients are preferably not increased to a larger value;

In order to improve sensitivity adjustment, the changing of the envelope coefficients to increase the envelope coefficients to a larger value is preferably delayed by a time of a plurality of cycles. For example, the changing of the envelope coefficients is delayed by storage of values in a buffer and, in the situation where an intrusion event is detected, the values stored in the buffer are discarded.

In order to improve sensitivity adjustment, there is preferably provided for each envelope coefficient a floor value and when envelope coefficients are decayed to a decay value below the floor value, that envelope coefficient is replaced with the floor value.

While the system herein can be used in many other sensing devices as discussed above, it finds particular advantage for use in monitoring a perimeter security system where the optical fiber extends along at least a part of the perimeter security system and said disturbances of the optical fiber are caused in response to intrusion events on the perimeter security system. In this case, the analysis compensates for noise on the fiber caused by weather sufficiently to detect standard intrusions in the presence of said weather conditions such as wind and rain.

Depending upon the application or system being monitored, the data can represent subsets of data in either streaming data as a representation of distance or data as a representation of elapsed time. A common method for representing the signal exiting a DAS system is called a "waterfall".

In the arena of perimeter security, installing an optical fiber on a fence allows some benefits:

As glass contains no conductors, fiber optic sensors are inherently resistant to common electrical issues such as the need for local power for the sensor;

As the fiber optic sensor contains no metal conductors, resistance to effects of lightning causing damage to the head end interrogator;

As there is no electrical conductor, there is a decrease in shock hazard;

No bonding of the conductors or shields is required.

The concept of the present invention is to find a way to take algorithms designed for zone systems, which do not use OTDR to locate the intrusion, and apply them to data of the DAS waterfall as it occurs. That is in essence to treat each location or block of locations as an individual zone. Thus an installation can be broken into "zones" with each zone or location being analyzed by the algorithm. This would allow several options:

Zones can be as large or small as desired or processing allows;

Zones can be automatically adjusted to match the size of the disturbance as detected, that is very wide if used in wind conditions or very narrow if related to fence cut Also the number of streams in each block can be changed depending on detected changes on the object to be monitored and/or changes in the environment at the object which can be different at different positions or zones of the object and can affect the object in different ways. These changes can be monitored and used to determine a change in the length, or number of streams, of one or more of the blocks, that is the length of the zone selected.

For example, a fence that is unprotected and runs perpendicular to the direction that the wind is blowing will indicate a disturbance over the entire exposed length. Conversely, an intruder cutting through the fence with a bolt cutter will create a very narrow disturbance. The system can evaluate the width of the disturbance and use that information to select the width of the block or signal for analysis. A wind event, therefore, will be treated as a single zone or block for purposes of analysis. A cut intrusion will be focused in on the narrow excitation, so as to select a very narrow block, reducing interference from adjacent areas of fence by discarding those streams in those areas into other blocks.

In this manner, all or part of a linear portion can be thought of as though it were one zone in a zone monitoring system. For example, if 150 m of fence is to be monitored with no need for information regarding the location of an intrusion attempt, the entire length can be treated as a single zone. Averaging all of the points horizontally along a region and feeding that into a zone-type detection algorithm is functionally identical to monitoring the same section of fiber as a single zone with a non-locating monitoring device. This can be applied during installation of the system to portions as wide or narrow as is appropriate for the application, such as a length of fence which is easily viewed, or as a gate which has a length of fiber attached to it but is treated as a single entity with no need for location information.

Data streams may be used as though they were a single stream feeding the algorithm using horizontal averaging of each line as it enters the waterfall, vertically averaging at each location, and vertically averaging wider zones or blocks of streams.

The algorithms that can be used from existing zone products have the advantage is that very sophisticated algorithms have been developed for the zone products which greatly simplify the tuning process.

Zone products are described in the U.S. Pat. Nos. 7,092,586, 7,206,469. 7,403,675, 7,376,293, and 7,693,359 by the present applicants which are cited here for reference and the disclosures of which are incorporated by reference.

As set out above, each stream from the detection system comprises a series of data values indicative of the magnitude of the disturbances in the respective portion over time where the system acts to select at least one block of the streams where the or each block of the streams contains at least one stream.

The algorithm applied to each block can use many systems for analyzing the data.

Some detection algorithms can include the following.

The arrangement shown in U.S. Pat. No. 7,634,387 (Murphy) of the present Applicant issued Dec. 15, 2009 which discloses an algorithm in which the signal which varies over time is monitored to determine an alarm condition, where the sample stream of digital values from an A/D converter is divided in to equal length pieces and a Fourier Transform (FT) algorithm is used to transform each piece of the stream into a three dimensional dataset including frequency domain amplitude, frequency and time. A Frequency Envelope is calculated by taking the maxima over the time dimension for a period of time, leaving a two-dimensional frequency domain amplitude vs frequency dataset which is compared with new data arriving to determine the alarm condition for each element of the Frequency Envelope either by applying a constant delta additively or multiplicatively or by using a "leaky bucket" algorithm.

The arrangement shown in U.S. Pat. No. 11,055,984 (Murphy) of the present Applicant issued Jul. 6, 2021 which discloses an algorithm which provides a method of detecting intrusion events including at least two different event types which have different characteristics of frequency and time comprises providing a sensor responsive changes in a medium generated by a potential intrusion event with the sensor generating an output signal indicative of the changes in the medium, analyzing the signal to determine changes in amplitude so as to detect the change in amplitude of the detection signal as a function of time, and performing at least one of: (i) in the frequency domain, carrying out a frequency analysis of the signal from the sensor and dividing the frequency analysis into separate sections which are selected so as to correspond to the characteristic frequencies for each event type, or (ii) the algorithm requiring the presence or absence of a time domain step function.

The arrangement shown in co-pending U.S. patent application Ser. No. 17/583,611 (Murphy) of the present Applicant filed Jan. 25, 2022 entitled Method Of Analyzing A Monitoring Signal From A Sensing System To Determine An Alarm Condition which discloses an algorithm where the monitoring signal is provided as a stream of digital values which are analyzed using a frequency-based or time-based algorithm to generate a plot of elements, applying a delta to each element of the plot of elements to adjust sensitivity thereof to provide a threshold and comparing a plurality of the elements of the stream with the threshold and triggering the alarm condition in the event that the threshold is exceeded; where the algorithm is changed in different time periods in response to ambient conditions of the environment determined for those time periods.

The arrangement shown in co-pending U.S. patent application Ser. No. 17/980,359 (Murphy) of the present Applicant filed Aug. 18, 2022 entitled Intrusion Detection Algorithm with Wind Rejection Heuristic which discloses an algorithm where the monitoring signal is provided as a stream of digital values which are analyzed using a frequency-based transform to generate a set of transform coefficients which are compared to a set of envelope coefficients. The sensitivity of the analysis is automatically controlled to accommodate environmental noise on the fiber by increasing the envelope coefficients to make the analysis less sensitive at each cycle by adopting the larger value from the comparison and by decaying the envelope coefficients at each cycle over time to a smaller value down to a floor value.

The disclosures of each of the above cited applications and patents are incorporated herein by reference.

Thus the algorithm includes:
carrying out a frequency and/or time dependent analysis on each block of the streams to create at least one coefficient dependent on the data values;
comparing said at least one coefficient with a coefficient value;
and in response to said comparing generating an output indicative of a detection of an intrusion event.

BRIEF DESCRIPTION OF THE DRAWINGS

FIGS. 4A to 4E show a series of steps from the algorithm of FIG. 3 showing the comparison between the transform coefficients and the envelope coefficients together with the modification of the envelope coefficients which carry out the automatic sensitivity changes to accommodate environmental noise on the fiber according to the invention.

DETAILED DESCRIPTION

Where the arrangement herein is intended for use with perimeter fence intrusion detection, there are multiple intrusion types which need to be detected which are:
Fence fabric cut;
Fence fabric lift and crawl below lifted section;
Fence climb.

A significant challenge to monitoring a fence with a fiber optic vibration and motion detecting sensor is the detection of an intrusion in the presence of strong weather such as wind or rain. Typically, systems will suppress false alarms in the presence of strong weather, however that introduces a vulnerability wherein a nefarious operator with knowledge of the system would wait for a weather event for scheduling an intrusion.

Figure 1:
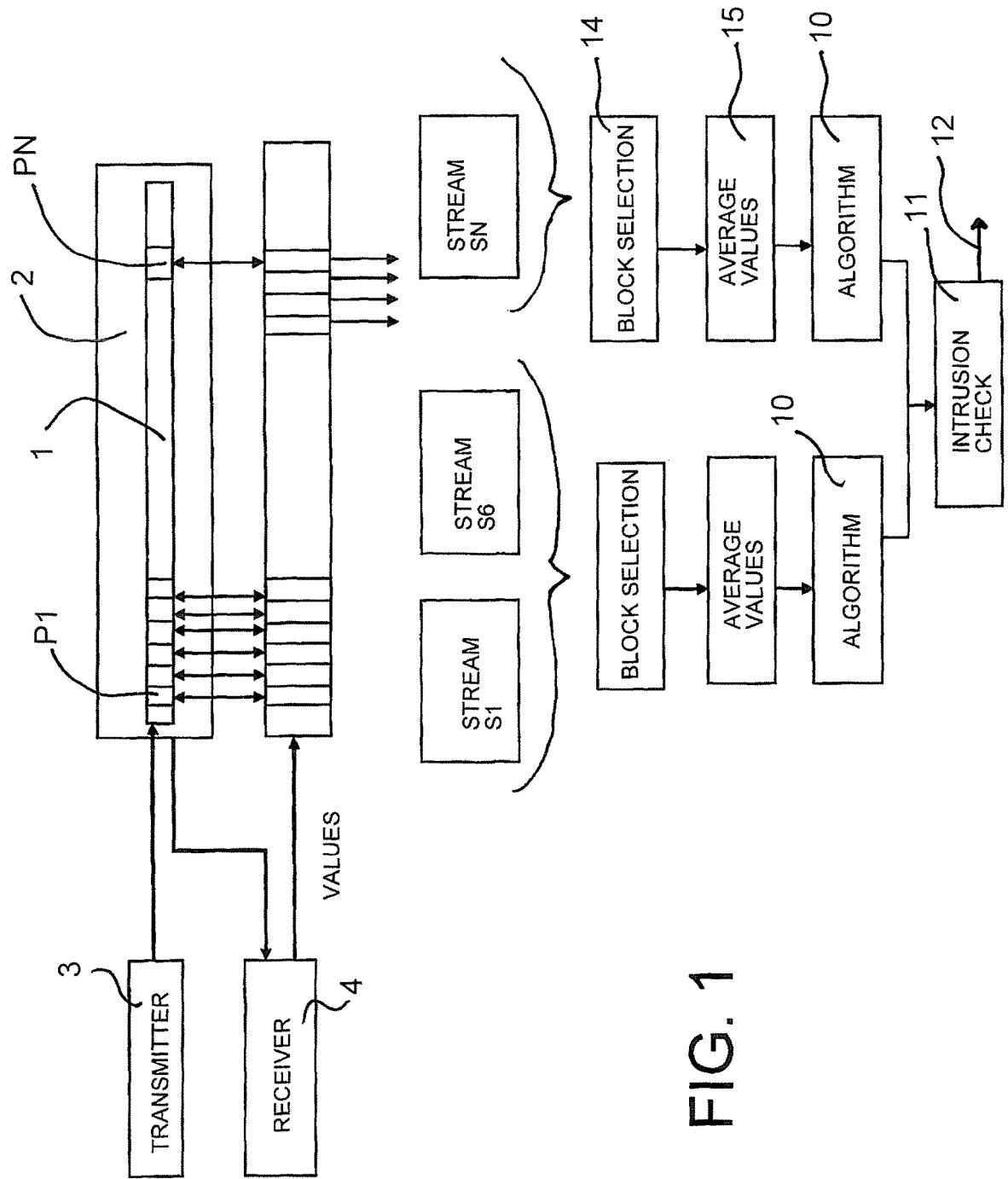
FIG. 1 shows a length of a perimeter fence which includes an optical fiber attached thereto which acts as a monitor of disturbances indicative of an intrusion event and shows schematically the basic components of the monitoring system according to the present invention.

This invention outlines the application of the detection algorithms developed for zone products for application to portions of data collected or reported by the locating system shown in FIG. 1.

There is an optical sensing system shown in FIG. 1 provided by an optical fiber 1 mounted n a fence 2 covering the protected perimeter. This can cover the whole perimeter or may be divided into sections such as particularly sensitive areas.

The optical sensing system provided by the optical fiber 1 is sensitive to vibration and movement. Thus the fiber 1 acts to encode vibration and movement into the light passing through the monitoring fiber from a transmitter 3 so that the signals transmitted are modified and reflected to a receiver at the head end. In this arrangement known as DAS the receiver is arranged to be responsive to the intensity of the signal which is measured as a function of time after transmission of the laser pulse. When the pulse has had time to travel the full length of the fiber and back, the next laser pulse can be sent along the fiber. Changes in the Coherent Rayleigh Noise (CRN) of successive pulses from the same region of fiber are caused by changes in the optical path length of that section of fiber. The magnitudes of the changes depend on the strength and type of disturbance acting on the fiber. This type of system is very sensitive to both strain and temperature variations of the fiber and measurements can be made almost simultaneously at all sections of the fiber.

As shown in Figure the signal is transmitted from the transmitter 3 into the fiber 1 so as to introduce a monitoring optical signal into the optical fiber 1. The reflected signals are received by the receiver 4 so as to receive optical signals from the optical fiber which are modified by events which affect the optical fiber.

As is known in the art, the DAS receiver acts to divide the optical signals into a plurality of streams S1 to SN, where each stream is associated with a specific respective portion P1 to PN of the optical fiber with the portions P divided along the length of the optical fiber so that each stream is indicative of disturbances in the respective portion P. Each stream S1 to SN comprises a series of data values indicative of the magnitude of the disturbances in the respective portion over time. This output is known as a "waterfall" and is a well-established output form a DAS system.

These portions or streams can be collected in a variety of ways, representing a variety of data sets. These collection methods known to persons skilled in the art and available in the data from system used in practice such as DAS can be:
 Streaming raw;
 Streaming Internally processed;
 Internally processing within the locating system itself;
 Recording and transporting to a processor.

Additionally, depending upon the application the data can represent subsets of data in either streaming data as a representation of distance or data as a representation of elapsed time.

The captured signal streams S1 to S6 are applied to an algorithm 10 which provides data to an intrusion detection system 11 for carrying out a frequency and/or time dependent analysis on each block of the streams to create at least one coefficient dependent on the data values, comparing the coefficients thus generated in the intrusion check 11 with a coefficient value such as a threshold and in response to said comparing generating an output 12 indicative of a detection of an intrusion event.

The algorithm can use known systems such as Fence Detect, Smart Filter Detection (SFD), or Intrusion Signature (IS) as identified above.

The algorithm is therefore used on the data vertically up the waterfall. This allows for zooming in on a specific location on the fiber or the object being monitored of any desired selected width and treat that data stream as though it were the solitary reading over time of a zone system. The nature of DAS contains a great dal of randomness and noise on a signal. Averaging of this signal at a zone or block of the streams of data on the waterfall can reduce the randomness while preserving the true signal.

Dependent upon the processing capabilities of the system, it might be advantageous or necessary to utilize time division multiplexing to scan from block to block to perform this detection analysis. This is of course less desirable than monitoring and detecting the blocks within all portions simultaneously but processing capability restrictions may require this to be adopted.

In the output, the horizontal axis of the waterfall represents signal verses distance. That is, left to right indicates distance from some origin to a linear sensor extending to a location or along the fiber. This can be divided or a sample used to act as a "zone" of interest. For example, in a 2 km installation it is possible that only the section of a gate, for example, from location spanning 1.2-1.3 km. It is possible to isolate just that portion for analysis.

The vertical axis indicates signal at each of these locations as it changes over time thus forming the streams S1 to SN. Analyzing the vertical axis allows analysis of zones as small as the sampling rate of the interrogator, or as large as the entire span. These widths can be defined for areas such as a gate, and can be dynamically altered.

In the zone sensor systems, the aggregate data from the entire length of sensor is streamed into the detection algorithms over time, representing change over elapsed time without consideration of location along the sensor.

Figure 2:
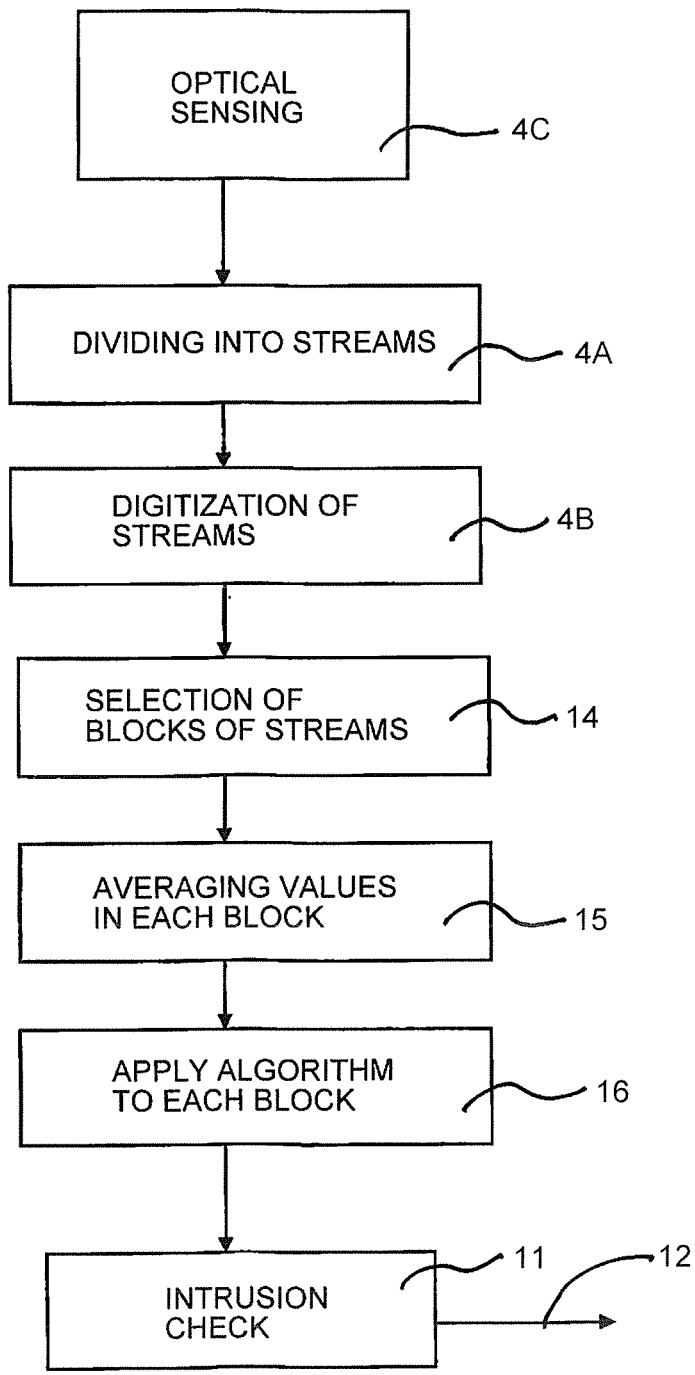
FIG. 2 is a flow chart showing the steps of the method according to the present invention shown graphically in FIG. 1.

As shown in FIG. 2, the receiver 4 is divided into or includes sections 4A, 4B and 4C where section 4C acts to receive and analyze the signal emitted from the fiber to extract the required components, provide suitable filtering and to generate the required output. At 4A, the data is divided into streams where each stream is associated with a respective location on the fiber. At 4B the data output om each steam is converted into a stream of digital data or values. Arrangements for these functions are well known and commercially available.

At step 14, a selection is made of certain streams to be formed into a block of streams. As above, typically there is a plurality of blocks of the streams where each contains a plurality of streams. However the number of blocks can be smaller or larger and the number of streams can be larger or smaller. The blocks can have different number of streams depending on the location on the fiber. The selection step 14 can be carried out at installation depending on the geometry of the installation or can be carried out dynamically by changes detected during the analysis.

In step 14 for each block, the data values of the plurality of streams in the block are collated to form a single stream of data for the algorithm. This is typically done by averaging the data horizontally but other collations methods may be used.

The number of streams in each block is selected to select desired sections of the length of the optical fiber and the number of streams in each block is variable. In some cases at least one block is selected so as to monitor an entire length of the optical fiber or a portion thereof.

A width of the blocks defined by the number of streams therein, that is the number of streams in each block, is dynamically changed for example in response to changes in environment.

Thus the number of streams in at least one block is different from the number of streams in at least one other block and can be selected at installation or changed dynamically during operation. Thus the number of streams each block is varied depending on detected changes on the object to be monitored and/or changes in the environment at the object which can be different from different positions of the object.

Each block contains the streams of signals at each of these locations along the fiber as it changes over time and wherein analyzing the streams allows analysis of zones as small as the sampling rate of the interrogator, or as large as the entire span.

The streams in each block can comprise raw data from the received signals or the streams are pre-processed such as by filtering or averaging.

In step 16 the algorithm is applied to the selected block or to each block independently of other blocks and the data from the algorithms is used to check for intrusions at step 11 providing the output 12.

Figure 3:
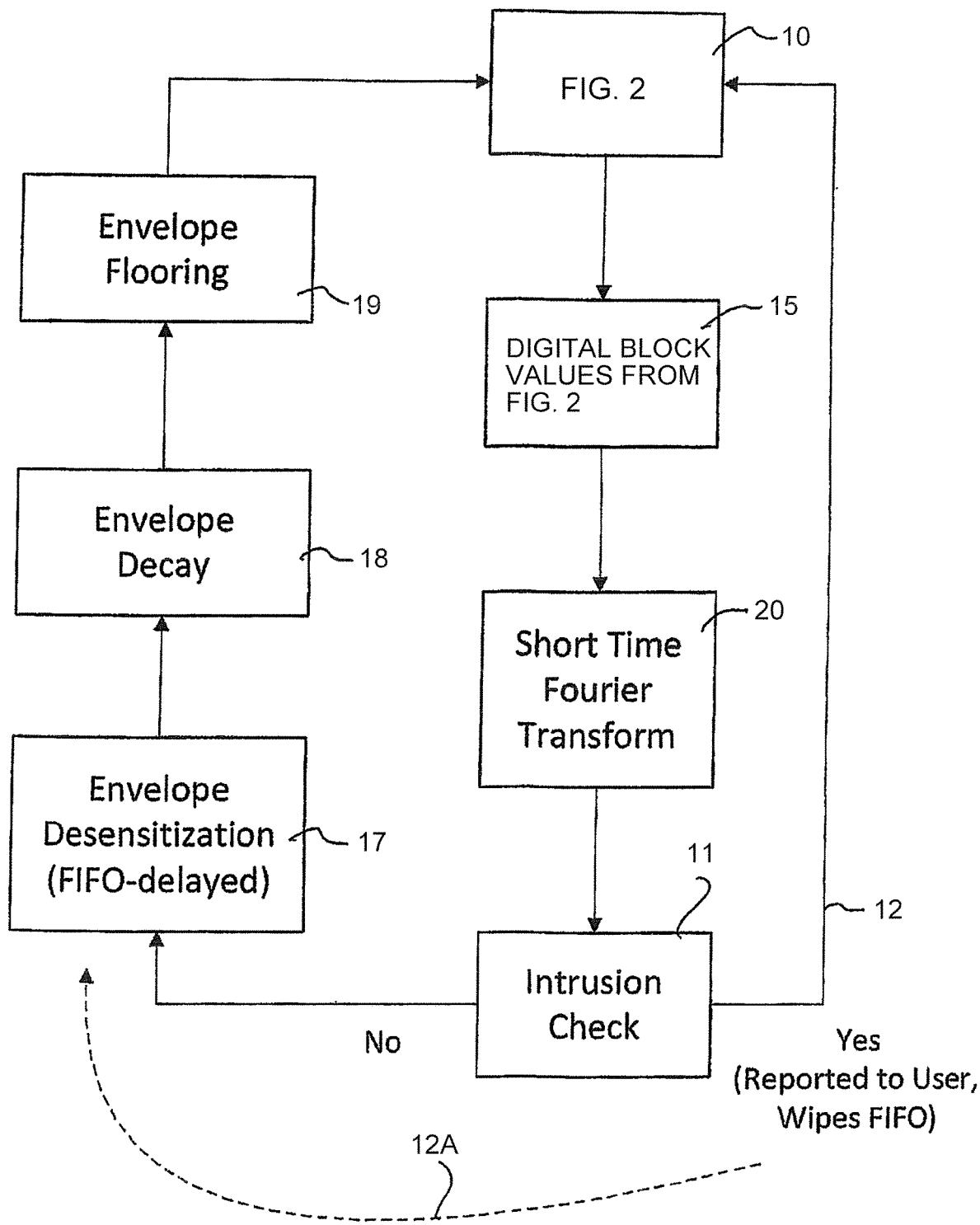
FIG. 3 is a flow chart showing one example of an algorithm for use in the method of FIG. 1.
Figure 5:
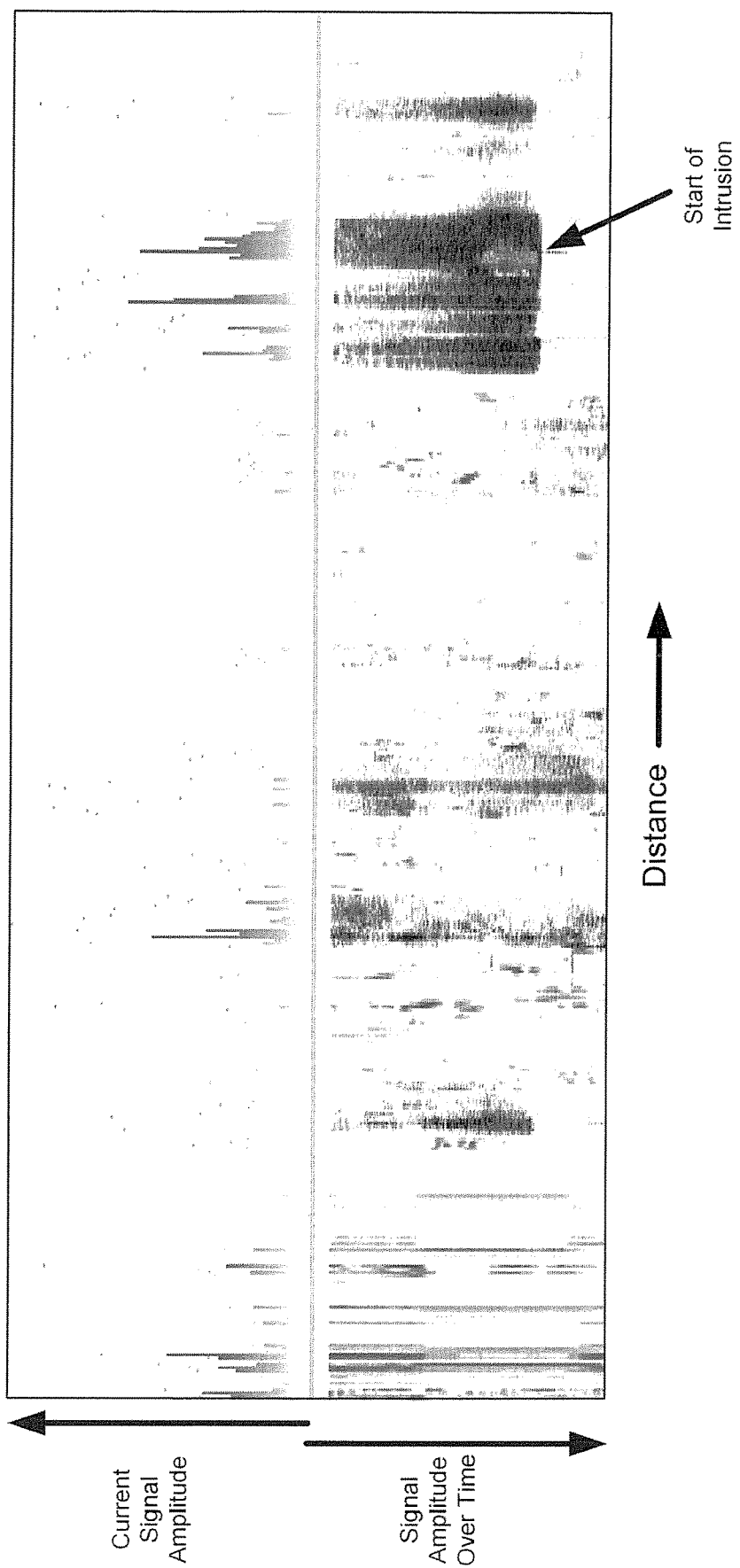
FIG. 5 is an image showing data from a DAS system as a DAS waterfall where the top portion displays the signal level as a function of distance in real time and the lower portion displays a rolling representation of the instantaneous levels over time.

As shown in FIG. 3 in one example of an algorithm, in a Short Time Fourier Transform step 20, the sequence of digital samples from each block shown in FIG. 2 at step 15 is converted into a sequence of Fourier Transform coefficients. The incoming signal is first converted into a sequence of fixed-sized temporal sections. The temporal sectionjs are of fixed or constant length. Each fixed sized block of samples has the Fourier Transform applied to generate the Fourier transform coefficients shown in FIGS. 4A to 4D.

An intrusion event is sensed at step 11 by comparing the Fourier Transform coefficients against a series of Envelope coefficients. The comparisons are shown in FIGS. 4B and 4C where the transform coefficient is shown at "signal" and the envelope with which is it compared is shown at "envelope". The Envelope is a block of numbers or coefficients where the block is the same size as the Fourier Transform and where corresponding or associated coefficients in the Envelope and Fourier Transform are compared.

As shown at step 11, an intrusion is sensed if one or more Fourier Transform coefficients exceeds its corresponding Envelope coefficient by a predetermined threshold which is set as a hard value in the programming or may be user configurable. If adjustable, the overall sensitivity of the system can be controlled by adjusting the threshold.

If an intrusion event is sensed by the comparison as shown in FIG. 4C, no further manipulation of the envelope coefficients is performed. That is as shown at link 12A in FIG. 3 where the indication of the intrusion event is communicated to the envelope coefficient management system described below so as to prevent further modification of the envelope values.

Any sensed intrusions are reported to the user along a link 12 thus bypassing the envelope management system described below.

The intrusion check system 11 may wait (not shown) after detection of an intrusion event for a short period of time to give time for further intrusion events to be detected thus allowing the system to absorb subsequent intrusion sense events into a single reported event.

The management of the Envelope coefficients in order to automatically change a sensitivity of the analysis to accommodate environmental noise on the fiber is shown by the steps 17, 18 and 19:

Thus the system can desensitize itself to accommodate increasing environmental noise conditions such as wind.

In step 17 and as shown in FIG. 4B, if the Fourier Transform coefficient (signal) is greater than the envelope, but the difference is less than the threshold which would trigger an intrusion event detection, the envelope coefficient is changed to become less sensitive. That is for each corresponding coefficient in the Envelope and Fourier Transform, the Envelope coefficient is changed, as shown in FIG. 4D, to adopt the larger value where the larger value is equal to the actual difference which was detected in FIG. 4B.

As part of the same envelope management, the system makes itself more sensitive to accommodate decreasing environmental noise conditions such as the waning of wind. That is, as shown in FIG. 4E, at each cycle of operation defined by analysis of the next block of data from the selected block of the signal, each coefficient in the set of the Envelope coefficients shrinks or is decayed and thus slowly becomes more sensitive over time on a step-by-step basis after each cycle. In other words, each coefficient in the Envelope is reduced by a small amount (Decay). The decay value can be a hard programmed value or may be user configurable. It will of course be appreciated that a change in the Decay value can be used to make the system become more sensitive faster or slower. As stated above this can be selected at an installation to best suit the system being monitored.

However to prevent the system from becoming too sensitive to avoid false alarms from small events, for each Envelope coefficient that falls below a present floor value, that coefficient is replaced with the floor value. In this way the envelope coefficients are gradually and repeatedly decayed for each cycle until they reach a pre-set floor value whereupon the floor value is held. In this way, small events can be discarded and do not trigger an intrusion event detection. Such small events can include vibration and movement from small rodents, thermal expansion, and impact from small objects including raindrops, small hail, snow, small flying debris, etc.

The floor value may be pre-set or may be user configurable. A larger floor value makes the system less sensitive to small events.

The balanced effects of the increase in the envelope value after a comparison and desensitization action at step 17 and after the gradual decay or decrease in the value at step 18 and the floor value control at step 19 thus act to provide new values or coefficients which are communicated to the intrusion check step 11.

In accordance with one important feature the system is arranged so that changing of the envelope coefficients to increase the envelope coefficients to a larger value is delayed by a time of a plurality of cycles. This can be done in a first in first out buffer (FIFO) which acts as a buffer and holds each value for a number of cycles or a set period of time. Thus for example the system may be run at a rate of 10 cycles per second and the FIFO acts as a delay of 2 or 3 seconds so that the delay can be as much as 20 cycles. The purpose of this is to prevent intrusions with a slow start from desensitizing the system. For example, a person getting ready to climb a fence may wiggle it gently such that it does not trigger an alarm, but is enough to desensitize the system which could cause the immediately following actual intrusion event to be missed. Thus the FIFO buffer acts to delays desensitization steps to ensure that there was no intrusion associated with it. If an intrusion is detected then all desensitization steps awaiting in or stored in the FIFO buffer are cancelled and not applied to the envelope.

As shown at step 17, the changing of the envelope coefficients to increase the envelope coefficients to a larger value is delayed by a time of a plurality of cycles by use of the FIFO described above.

The arrangement herein thus acts to monitor the entire distance or portion thereof as though it was one or more zones of a zone systems. The signal is fed over time to the detection algorithm. The system also monitors a block of the signal over time in the so-called waterfall. This signal can be the entire width, or one or more blocks of any size.

The width of the above blocks can be dynamically changed, for example widened in the event of rain, Each location is treated as a zone and the detection algorithm is applied to each. This creates a near zero-tune DAS system as each location is independently monitored. Applying the above zone principles and algorithms to the DAS system also provides a high level of nuisance alarm and false alarm rejection.

Turning now to the examples of data shown in the images of FIGS. 5 to 9, FIG. 5 is an image showing data from a DAS system as a DAS waterfall where the top portion displays the disturbance amplitude as a function of linear distance from left to right in real time, and the lower portion displays a rolling representation of the instantaneous levels over time in what is called a waterfall. The peak values of the instantaneous trace from the upper half of this display will be "written" as the highest line in the lower display. As each line is written, all traces below it decrement one position. Shown in real time, the lower trace flows like a waterfall, and trends are easily seen. For example, in FIG. 5 the start of a large dark area in the right-most third of the waterfall indicates a disturbance has initiated. The display went from quiet (light) to active (dark).

Figure 6:
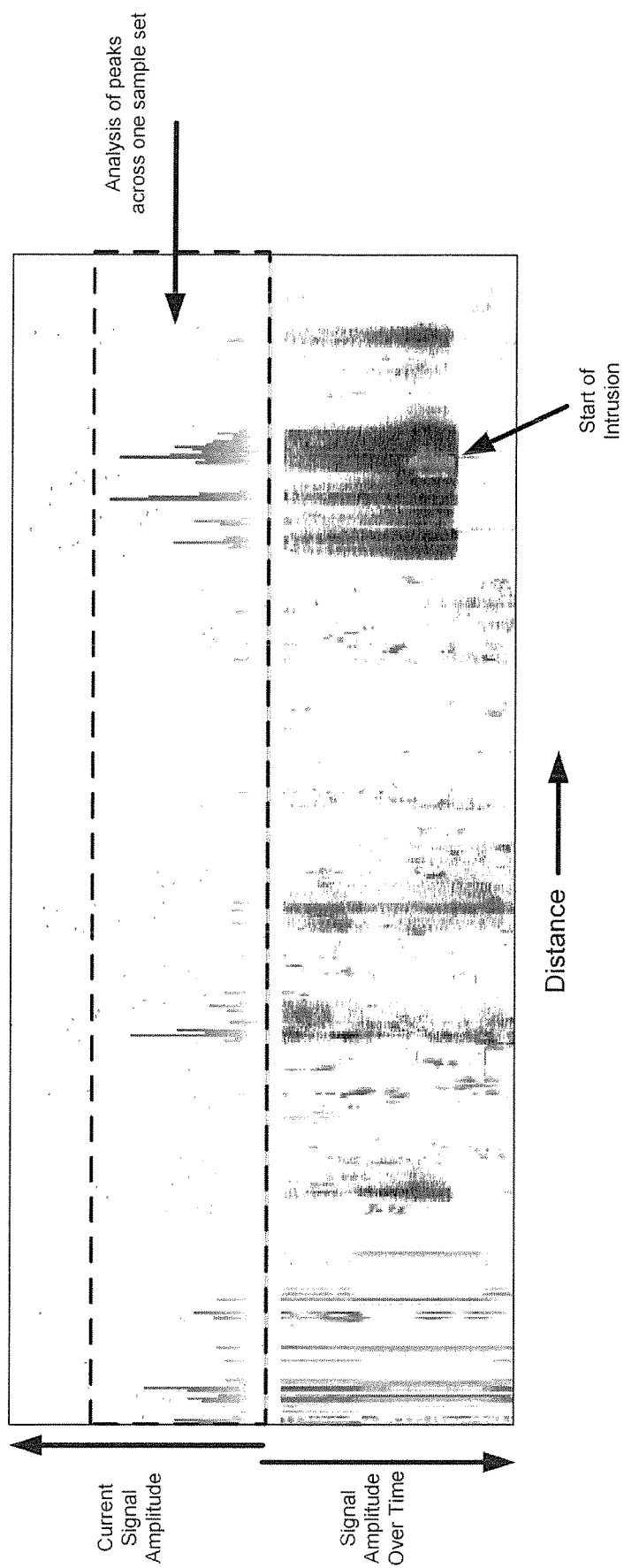
FIG. 6 is an illustration of the data set acquired for applying the detection algorithm across the entire length as one zone for a single sweep in real time.

FIG. 6 is an illustration of the data set acquired for applying the detection algorithm across the entire length as one zone for a single sweep in real time. As above, the upper trace displays the real time instantaneous trace of amplitude of the signal along the sensing fiber. One method is to average all of the peak values within the box shown and assign a single value to it. These can then be fed in succession into the detection algorithms.

Figure 7:
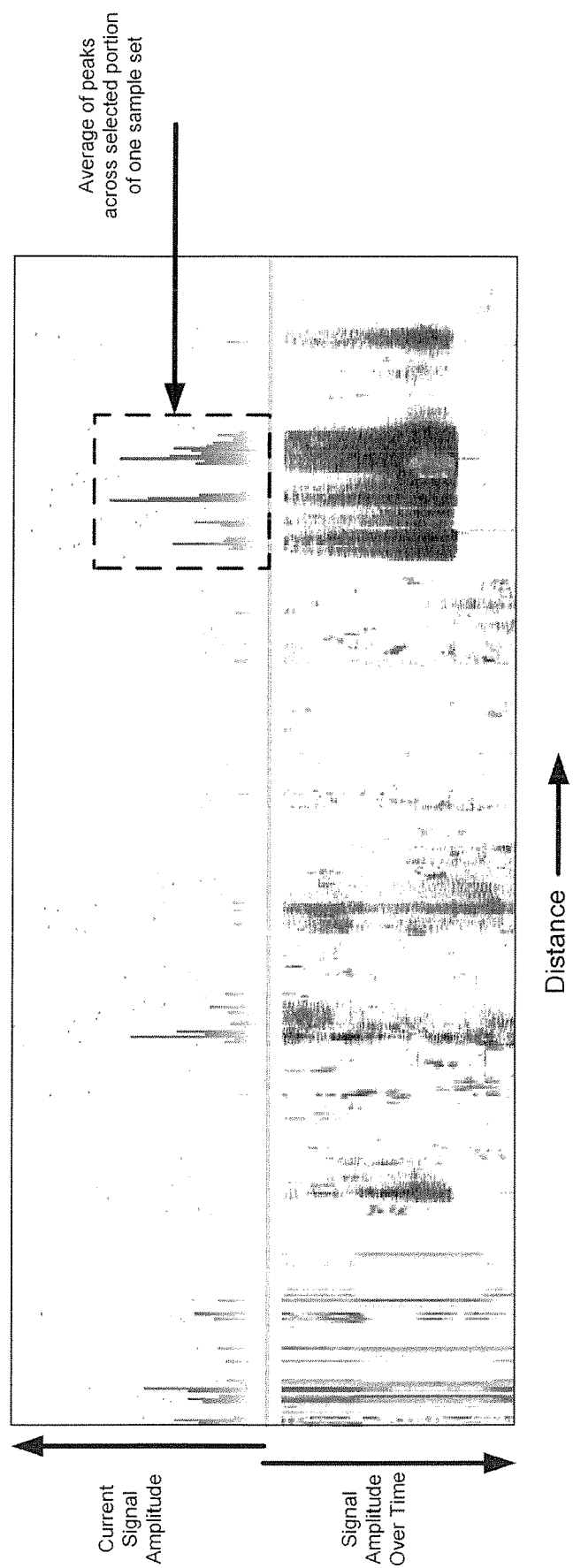
FIG. 7 is an illustration of the data set acquired for applying the detection algorithm across a finite length of one zone or area indicative of a single block in real time.

FIG. 7 is an illustration of the data set acquired for applying the detection algorithm across a finite length of one zone or area indicative of a single block in real time. This illustrates the portion of signal to be analyzed if one were to assert the method shown in FIG. 6 across a selected portion or zone of the sensing fiber.

Figure 8:
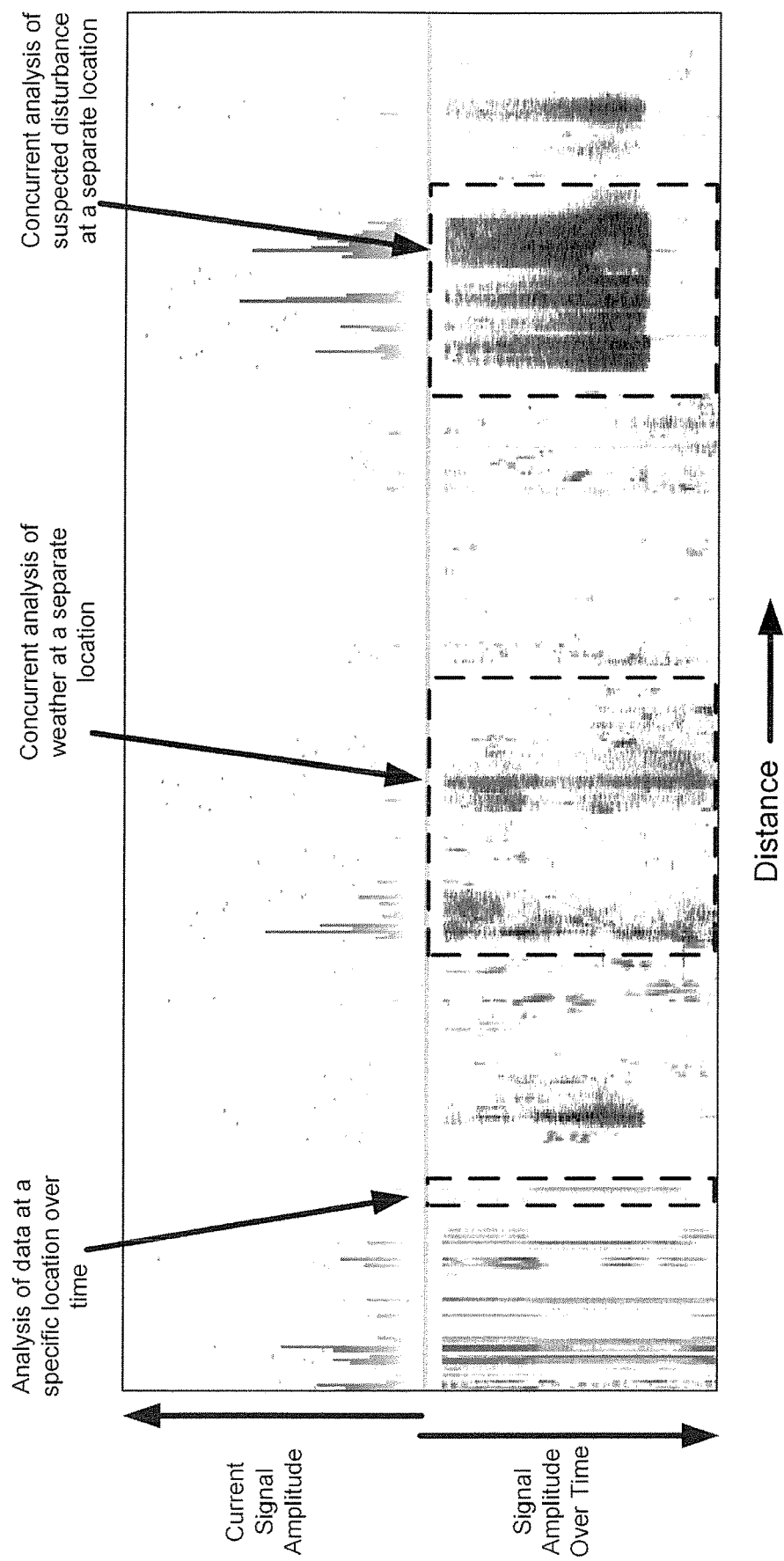
FIG. 8 is an illustration of the data set acquired for applying the detection algorithm across multiple zones simultaneously.

FIG. 8 is an illustration of the data set acquired for applying the detection algorithm across multiple zones simultaneously. In the lower trace, the boxes indicate individual portions or zones which can be treated independently for analysis. In the shown example, moving from left to right is found first a narrow zone with no activity apparent. This could illustrate a narrow section, such as a gate or lock-box, which is monitored specifically and is currently not in alarm. Moving to the right is a wider path blocked off. This might indicate a portion of fence that will be monitored without need to localize a disturbance within it. An example might be a fence with susceptibility to wind, but is within view of personnel or other monitoring. Moving farther to the right is another blocked area, monitored concurrently with but independent from the other blocks described above. In this section, there is clearly a disturbance of some sort which will be detected while the other zones are not affected.

Figure 9:
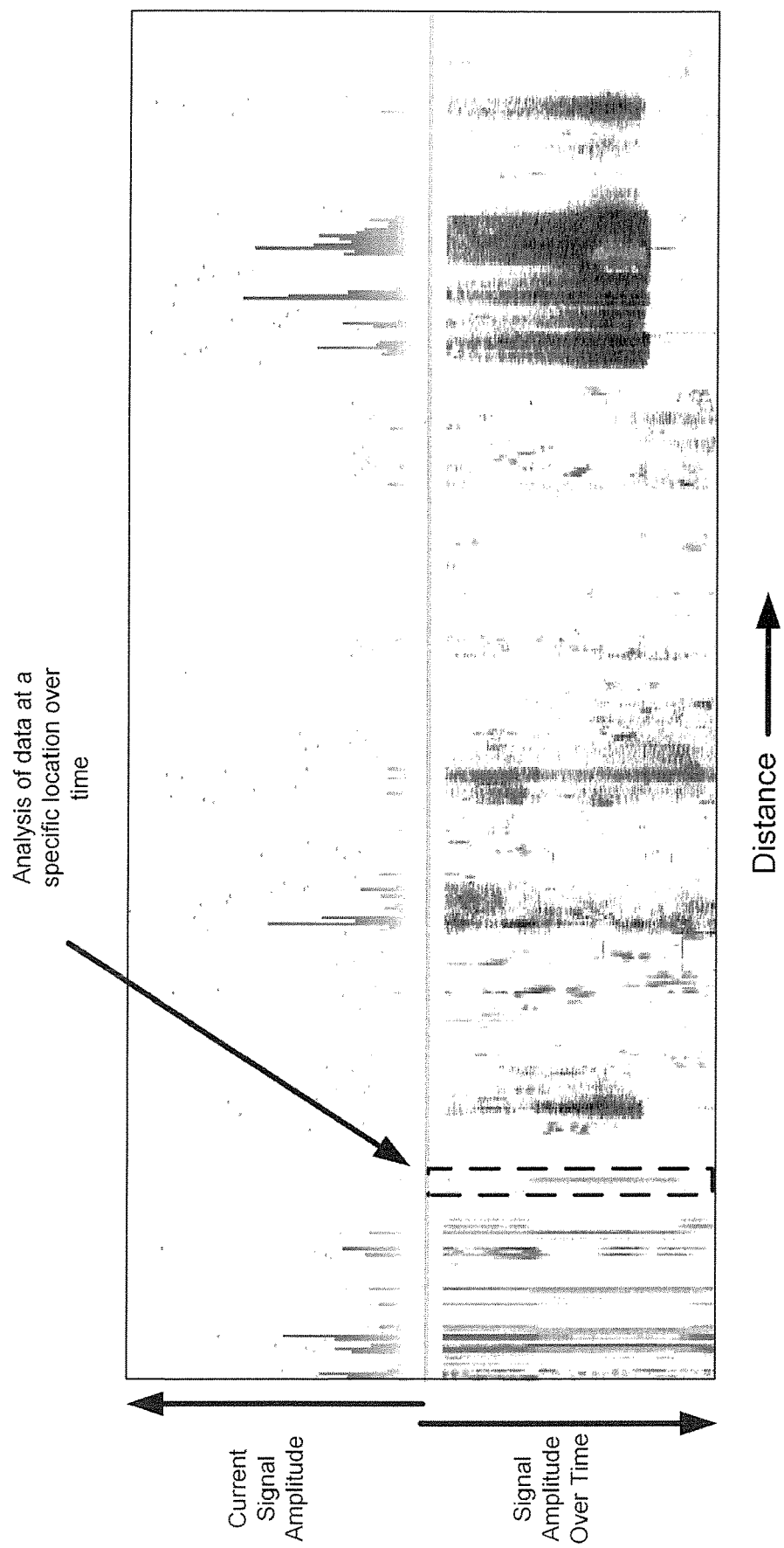
FIG. 9 is an illustration of the data set acquired for applying the detection algorithm across a finite length of one zone or area indicative of a single location.

FIG. 9 is an illustration of the data set acquired for applying the detection algorithm across a finite length of one zone or area indicative of a single location. In this illustration, a narrow portion of the whole is monitored for disturbance. This might be a door or a network lock-box that is at a specific location and requires specific monitoring. In this illustration, only that narrow portion is shown to be evaluated.

The invention claimed is:

1. A method for monitoring an optical fiber for disturbance events of the optical fiber comprising:
   introducing a sequence of monitoring optical signals into the optical fiber;
   receiving from the optical fiber optical signals in response to each of said sequence of monitoring optical signals which received optical signals are modified by disturbance events on the optical fiber;
   wherein the optical signals received in response to each monitoring optical signal are divided temporally into a plurality of data components, where each data component is associated with a specific respective length portion of the optical fiber with the length portions divided spatially along the length of the optical fiber so that each data component is indicative of disturbances in the respective length portion;
   wherein the sequence of monitoring optical signals creates for each respective length portion a sequence of the data components forming a separate data stream for the respective length portion;
   wherein each data stream thus comprises a series of the data components with each series being representative of the disturbances over time in the respective length portion;
   analyzing the data steams by selecting for analysis at least one block of the separate data streams where each selected block of the separate data streams contains a plurality of the separate data streams;
   for each selected block and for each of the sequence of monitoring optical signals, collating the data components from each monitoring optical signal of the selected block into a common data component;
   where the common data components of each block form a common data stream which is representative of the disturbances over time in the length of the fiber formed by said length portions;
   applying an algorithm to the common data stream of each selected block;
   and depending on a result of the algorithm generating an output indicative of a detection of a disturbance event.

2. The method according to claim 1 wherein the data components are collated by a mathematical averaging system.

3. The method according to claim 1 wherein the algorithm is separately applied to the common data stream of each selected block.

4. The method according to claim 1 wherein the algorithm comprises carrying out an analysis on the common data stream of each block to create at least one coefficient value dependent on the data values in the common data stream and comparing said at least one coefficient value with a threshold value to generate said output indicative of a detection of a disturbance event.

5. The method according to claim 4 wherein the algorithm comprises carrying out an analysis on the common data stream of each block to create a series of coefficient values dependent on the data values in the common data stream and comparing each of said coefficient values with a respective threshold value to generate said output indicative of a detection of a disturbance event.

6. The method according to claim 1 wherein the algorithm is based on determining differences from ambient disturbances and does not use recorded signatures from sample stimuli applied to the optical fiber.

7. The method according to claim 1 wherein the number of separate streams in at least one block is different from the number of separate streams in at least one other block.

8. The method according to claim 5 wherein the optical fiber is installed along an object to be monitored and the number of separate streams each block is selected on installation of the optical fiber in relation to different features of the object to be monitored along its length.

9. The method according to claim 1 wherein the number of separate streams in each block is variable.

10. The method according to claim 9 wherein the optical fiber is installed along an object to be monitored and the number of separate streams each block is varied depending on detected changes on the object to be monitored and/or changes in the environment at different positions of the object.

11. The method according to claim 1 wherein there is a plurality of selected blocks and the algorithm is applied to each selected block independently of other blocks.

12. The method according to claim 1 wherein the separate streams in each block comprise raw data from the received signals or the separate streams are pre-processed such as by filtering or averaging.

13. The method according to claim 1 wherein said common data stream has the data values thereof averaged over time.

14. The method according to claim 1 including automatically changing a sensitivity of the analysis to accommodate changing noise on the fiber.

15. A method for monitoring an optical fiber for disturbance events of the optical fiber comprising:
introducing a sequence of monitoring optical signals into the optical fiber;
receiving from the optical fiber optical signals in response to each of said sequence of monitoring optical signals which received optical signals are modified by disturbance events on the optical fiber;
wherein the optical signals received in response to each monitoring optical signal are divided temporally into a plurality of data components, where each data component is associated with a specific respective length portion of the optical fiber with the length portions divided spatially along the length of the optical fiber so that each data component is indicative of disturbances in the respective length portion;
wherein the sequence of monitoring optical signals creates for each respective length portion a sequence of the data components forming a separate data stream for the respective length portion;
wherein each data stream thus comprises a series of the data components with each series being representative of the disturbances over time in the respective length portion;
analyzing the data steams by selecting for analysis at least one block of the separate data streams where each selected block of the separate data streams contains a plurality of the separate data streams;
for each selected block and for each of the sequence of monitoring optical signals, collating the data components from each monitoring optical signal streams of the selected block into a common data component;
where the common data components of each block form a common data stream which is representative of the disturbances over time in the length of the fiber formed by said length portions;
applying an algorithm to the common data stream of each selected block;
and depending on a result of the algorithm generating an output indicative of a detection of a disturbance event;
wherein the algorithm comprises carrying out an analysis on the common data stream of each block to create at least one coefficient value dependent on the data components in the common data stream and comparing said at least one coefficient value with a threshold value to generate an output indicative of a detection of a disturbance event.

16. The method according to claim 15 wherein the algorithm comprises carrying out an analysis on the common data stream of each block to create a series of coefficient values dependent on the data values in the common data stream and comparing each of said coefficient values with a respective threshold value to generate said output indicative of a detection of a disturbance event.

17. The method according to claim 15 wherein the algorithm is based on determining differences from ambient disturbances and does not use recorded signatures from sample stimuli applied to the optical fiber.

18. The method according to claim 15 wherein the optical fiber is installed along an object to be monitored and the number of separate streams in each block is varied depending on detected changes on the object to be monitored and/or changes in the environment at different positions of the object.

19. A method for monitoring an optical fiber for disturbance events of the optical fiber comprising:
introducing a sequence of monitoring optical signals into the optical fiber;
receiving from the optical fiber optical signals in response to each of said sequence of monitoring optical signals which received optical signals are modified by disturbance events on the optical fiber;
wherein the optical signals received in response to each monitoring optical signal are divided temporally into a plurality of data components, where each data component is associated with a specific respective length portion of the optical fiber with the length portions divided spatially along the length of the optical fiber so that each data component is indicative of disturbances in the respective length portion;
wherein the sequence of monitoring optical signals creates for each respective length portion a sequence of the data components forming a separate data stream for the respective length portion;
wherein each data stream thus comprises a series of the data components with each series being representative of the disturbances over time in the respective length portion;
analyzing the data steams by selecting for analysis at least one block of the separate data streams where each selected block of the separate data streams contains a plurality of the separate data streams;
for each selected block and for each of the sequence of monitoring optical signals, collating the data components from each monitoring optical signal streams of the selected block into a common data component;
where the common data components of each block form a common data stream which is representative of the disturbances over time in the length of the fiber formed by said length portions;
applying an algorithm to the common data stream of each selected block;
wherein the algorithm is based on determining differences from ambient disturbances and does not use recorded signatures from sample stimuli applied to the optical fiber;
and depending on a result of the algorithm generating an output indicative of a detection of a disturbance event.

20. The method according to claim 19 wherein the algorithm comprises carrying out an analysis on the common data stream of each block to create at least one coefficient value dependent on the data values in the common data stream and comparing said at least one coefficient value with a threshold value to generate an output indicative of a detection of a disturbance event.

* * * * *